W. A. PINCKNEY & S. D. HURD.
ANTISKID DEVICE.
APPLICATION FILED MAY 6, 1918.

1,291,116. Patented Jan. 14, 1919.

WITNESSES
W. C. Fielding
V. B. Hillyard.

INVENTORS
William A. Pinckney
and Samuel D. Hurd
BY
Richard Owen.
ATTORNEY

UNITED STATES PATENT OFFICE.

WILLIAM A. PINCKNEY AND SAMUEL D. HURD, OF STANTON, MICHIGAN.

ANTISKID DEVICE.

1,291,116.

Specification of Letters Patent.

Patented Jan. 14, 1919.

Application filed May 6, 1918. Serial No. 232,874.

*To all whom it may concern:*

Be it known that we, WILLIAM A. PINCKNEY and SAMUEL D. HURD, citizens of the United States, residing at Stanton, in the county of Montcalm and State of Michigan, have invented certain new and useful Improvements in Antiskid Devices, of which the following is a specification.

The present invention relates to means for preventing the skidding of motor vehicles and also to insure positive tractive engagement between the drive wheels and the surface, thereby preventing the slipping or the spinning of the drive wheels when the engine is expending power for propelling the vehicle.

The invention has for its object to provide means which are positive in action for both purposes and which may be readily applied to or disconnected from the wheels as occasion may require.

A further purpose of the invention is the provision of means which admits of the ready replacement of disabled parts and which replacements may be economically and quickly made.

The invention also has for its object the provision of separate and independent traction elements and side members, the parts being of such formation as to hold the traction elements in relative given position while at the same time admitting of any one of the elements being readily replaced.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Corresponding and like parts are referred to in the following description and indicated in the several views of the drawings by like reference characters.

The device comprises like side members A and traction elements B.

Each of the side members is of chain like formation, the several links being coupled in any manner to admit of folding of the members when disconnected from the wheel of a motor vehicle so as to occupy a minimum amount of space. Each of the side members A is of a length corresponding approximately with the circumference of the wheel for which the device is intended and the ends of each of the side members are connected by means of a turn buckle 1, the terminal links being threaded as indicated at 2 to receive the threaded ends of the turn buckle. The several links are connected by interengaging eyes 3 which are interlooped. The intermediate portion of each of the links is offset as indicated at 4 so as to receive a terminal portion of the traction element. The links are preferably constructed of heavy wire of proper gage to withstand the strain and the several links with the exception of the terminal links, are of like formation, the terminal links differing only in that their coupling ends are made straight and threaded as indicated at 2 to coact with the turn buckle 1. The construction is such as to result in the provision of a side member having a degree of resiliency in the direction of the length of the member and this has been found to be of advantage. This is due to the offset portions 4 of the links.

Figure 1:
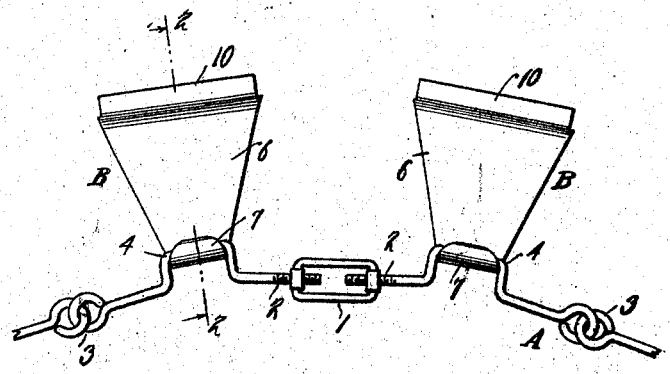
Figure 1 is a side view of a portion of a traction and antiskid device embodying the invention.
Figure 2:
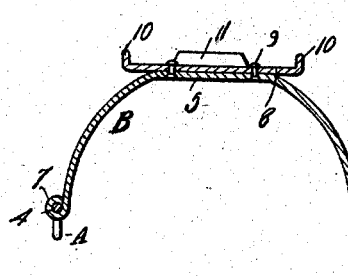
Fig. 2 is a transverse section on the line 2—2 of Fig. 1.
Figure 3:
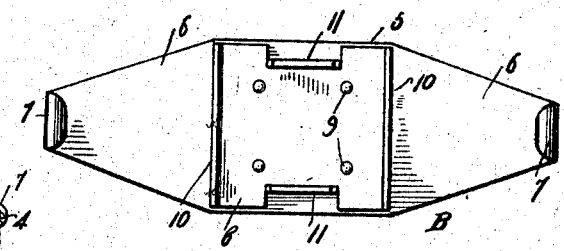
Fig. 3 is a diagrammatic view of one of the traction elements.

The traction elements are of like formation and each is constructed of a strip of sheet metal of a length to extend across the tread portion of the tire and along the sides thereof, a distance to make engagement with the side members A. The middle portion of the plate is of uniform width as indicated at 5, whereas the end portions 6 are made tapering and terminate in eyes 7 which are adapted to engage the offset portions 4 of the side members A. The tractor elements are curved in their length so as to conform to the transverse curvature of the outer face of the tire, as indicated most clearly in Fig. 2. The engaging ends 7 connect opposed offset portions 4 of the side members A, thereby holding the parts in given position.

A second plate 8 is secured to the middle 5 of each of the tractor elements and is preferably fastened thereto by means of rivets 9 which also assist materially in resisting wear and preventing slipping. Opposite edges of the plate 8 are bent at a right angle to form flanges 10 which prevent lateral slipping or skidding. The remaining two edges of the plate have portions 11 partly cut therefrom and bent outwardly at a right angle to provide flanges 11 which extend transversely of the tread of the wheel and prevent slipping. The flanges 10 and 11 act in the capacity of calks or tractor lugs to insure positive engagement between the traction element and the surface over which the vehicle is propelled.

It is to be understood that the device as a whole will be marketed in standard sizes so as to fit the various sizes of wheels and tires. In this connection it is to be understood that the device is designed for pneumatic tires as well as solid tires such as provided on the different types of trucks and motor vehicles for hauling heavy loads. This will entail different forms of the device to adapt the same to the different styles of tires and wheels but such changes are readily within the scope of the invention as defined in the subject matter hereinafter claimed. The device is placed in position in substantially the same manner as the ordinary tire chain and the ends of the side members are connected by means of the turn buckles, the latter serving to draw the side members close about the tires.

The foregoing description and the drawings have reference to what may be considered the preferred, or approved, form of our invention. It is to be understood that we may make such changes in construction and arrangement and combination of parts, materials, dimensions, et cetera, as may prove expedient and fall within the scope of the appended claims.

Having thus fully described our invention, what we claim as new and desire to secure by Letters Patent, is:—

1. A device of the character specified comprising side members, provided with regularly spaced transversely alined offset portions and traction elements having their ends engaging the offset portions of the side members.

2. A device of the character specified, comprising side members, each comprising connected links and having each of the links formed with an offset portion, and traction elements having their ends engaging the offset portions of the side members.

In testimony whereof we affix our signatures in presence of two witnesses.

WILLIAM A. PINCKNEY.
SAMUEL D. HURD.

Witnesses:
ALFRED L. STEARNS,
MADGE BLUMBERG.